Jan. 29, 1957 K. D. REED 2,779,620
BUMPER, GRILL AND PAN GUARD
Filed May 8, 1953 2 Sheets-Sheet 1
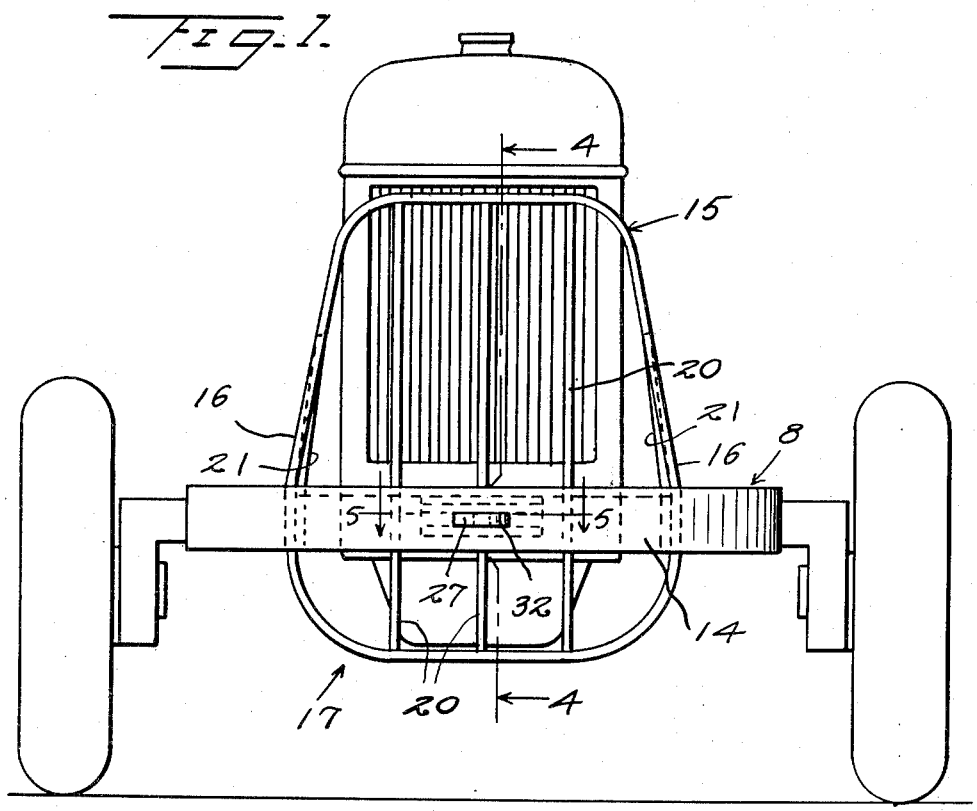
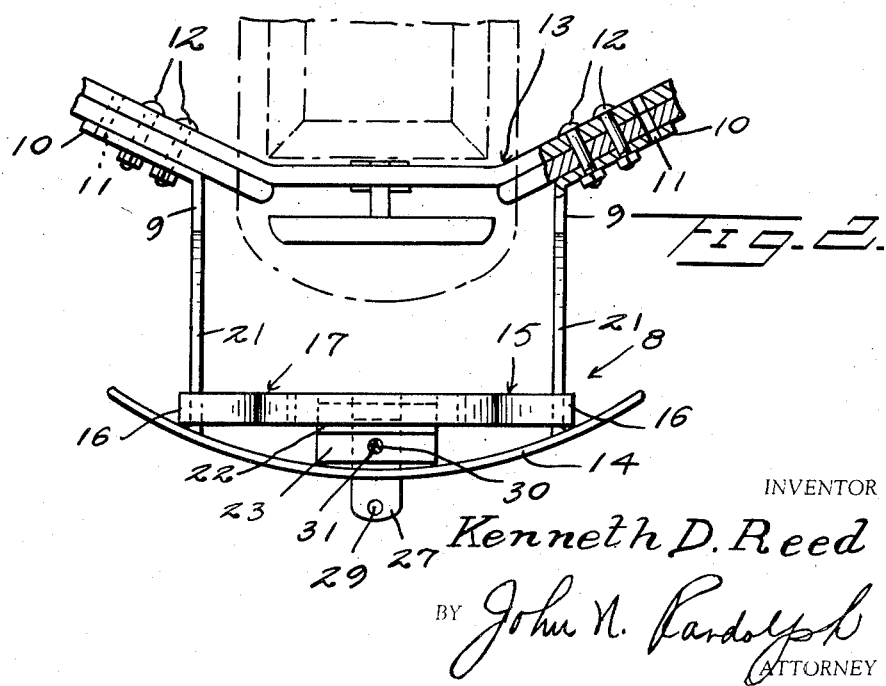
INVENTOR
Kenneth D. Reed
BY John N. Randolph
ATTORNEY Jan. 29, 1957   K. D. REED   2,779,620
BUMPER, GRILL AND PAN GUARD
Filed May 8, 1953   2 Sheets-Sheet 2
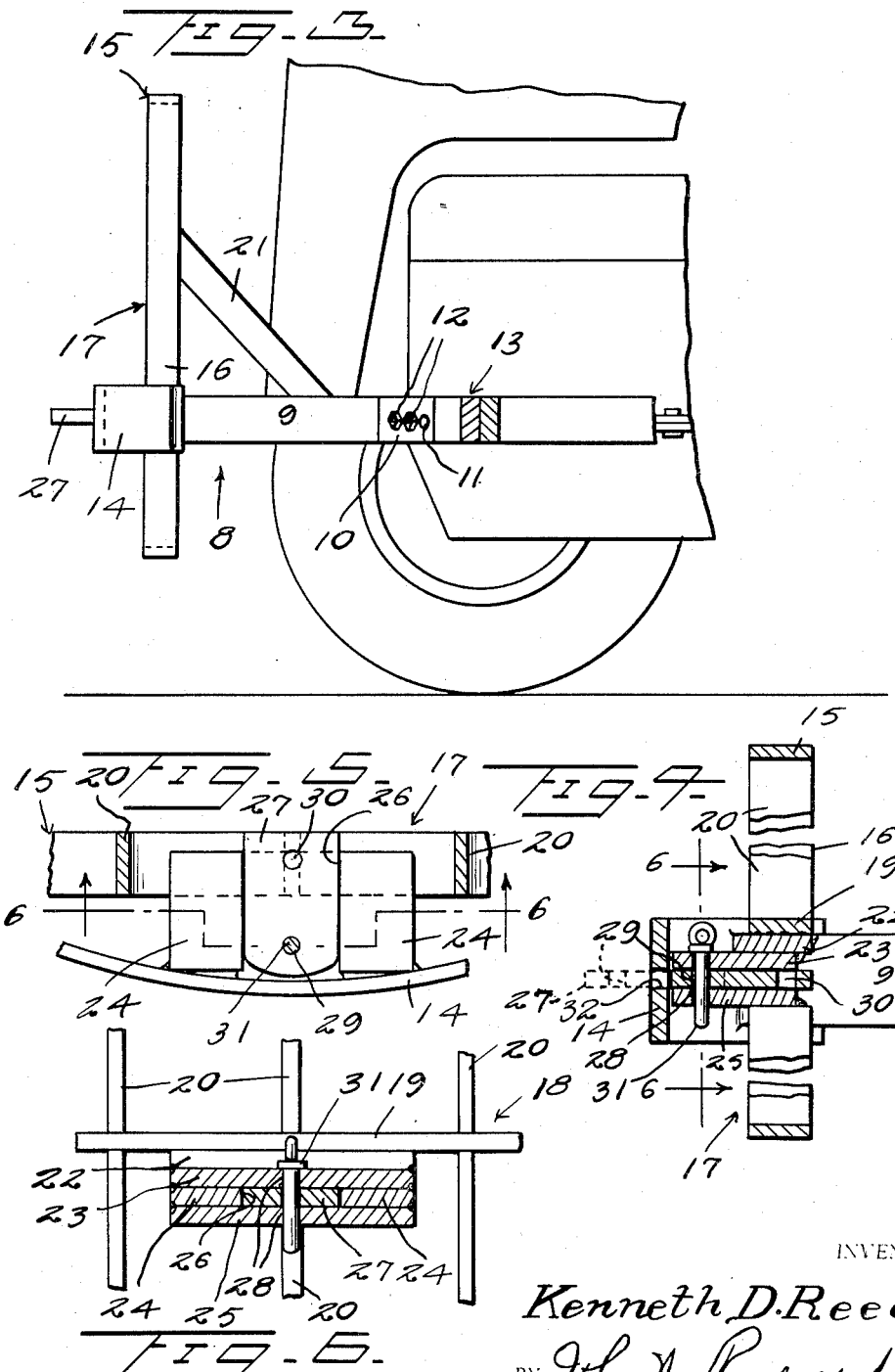

United States Patent Office 2,779,620
Patented Jan. 29, 1957

2,779,620

BUMPER, GRILL AND PAN GUARD

Kenneth D. Reed, Shelbyville, Ill.

Application May 8, 1953, Serial No. 353,755

4 Claims. (Cl. 293—64)

This invention relates to a novel front bumper for vehicles, particularly tractors, and has for its primary object to provide a bumper of extremely sturdy construction which may be readily mounted on the front axle of a tractor to protect the radiator and grill and also the crankcase or pan, and which is so constructed that it may be readily used for pushing other vehicles, the frames or chassis of which are disposed substantially above the level of the chassis of the vehicle on which the bumper is mounted.

Another object of the invention is to provide a bumper having a hitch bar slidably supported to assume a projected position for use or which may be retracted when not in use to a position where it cannot contact another vehicle engaged by the bumper for pushing.

Various other objects and advantages of the invention will hereinafter become more fully apparent from the following description of the drawings, illustrating a presently preferred embodiment thereof, and wherein:

Figure 1 is a front elevational view showing the bumper in an applied position;

Figure 2 is a top plan view, partly in section thereof;

Figure 3 is a side elevational view of the bumper and with a part of the supporting vehicle shown broken away;

Figure 4 is a fragmentary vertical sectional view on an enlarged scale of the bumper taken substantially along a plane as indicated by the line 4—4 of Figure 1;

Figure 5 is an enlarged fragmentary horizontal sectional view taken substantially along a plane as indicated by the line 5—5 of Figure 1, and Figure 6 is a vertical sectional view of a portion of the bumper taken substantially along a plane as indicated by the lines 6—6 of Figures 4 and 5.

Referring more specifically to the drawings, the novel bumper, grill and pan guard in its entirety and comprising the invention is designated generally 8 and includes a pair of supporting arms or brackets 9 having complementary outwardly flared rear ends 10 provided with spaced openings 11 for receiving nut and bolt fastenings 12 by which said ends 10 are secured against the forward side of a vehicle front axle 13. The axle 13 is of a conventional type and as illustrated is of the extensible type used on tractors having extensible end sections which are adjustably connected by the fastenings 12 to an intermediate axle section. Each of the end portions 10 is provided with at least one extra opening 11 to receive the fastenings 12 in different extended positions of the axle 13. The portions of the brackets 9 which extend forwardly from the axle 13 and which are disposed substantially parallel, are secured in any suitable manner at their forward ends to longitudinally spaced portions of a front bumper bar 14 which extends transversely thereof and which is outwardly bowed. The bumper also includes a radiator, grill and pan guard protector or shield including an outer frame 15 which is disposed behind the bumper bar 14 and which has complementary side portions 16 which are suitably secured to the arms or brackets 9 immediately behind said bar 14. Said shield or protector, designated generally 17, also includes a grill 18 disposed within the frame 15 including a horizontal bar 19 and a plurality of vertical bars 20. The ends of said bars 19 and 20 are suitably secured to portions of the frame 15 and said vertical bars are suitably secured to the horizontal bar 19. Said bars 19 and 20 are disposed with their edges facing the front and rear and with their sides parallel to the forwardly and rearwardly extending arms 9 to provide a shield 17 of maximum strength and which will offer a minimum of resistance to the passage of air therethrough to the vehicle radiator disposed therebehind. The upper portion of the shield or protector 17, located above the bumper bar 14, is braced against rearward displacement by diagonal braces 21 which are secured to the side portions 16 and extend downwardly and rearwardly therefrom and are secured at their lower rear ends to the arms 9, as best illustrated in Figure 3.

A plurality of guide blocks 22, 23, 24 and 25 are secured together in superposed relationship and are disposed between the underside of the intermediate portion of the horizontal grill bar 19 and a bottom portion of the intermediate vertical grill bar 20, and suitably secured to these parts. As best seen in Figure 4, the bars 23, 24 and 25 extend forwardly substantially between in which a hitch plate or bar 27 is slidably disposed between the bar 23 and the lowermost bar 25 and said bars 24 are spaced from one another laterally of the shield or protector 17 to define a slot or guideway 26 therebetween in which a hitch plate or bar 27 is slidably disposed for forward and rearward movement. The bars 23 and 25 which are disposed above and below the bars 24, respectively, are provided with vertically aligned openings 28 which communicate with the slot 26. The hitch plate 27 is provided with longitudinally spaced openings 29 and 30, either of which may be positioned in registration with the vertically spaced aligned openings 28. A latch pin 31 having a headed upper end is sized to slidably fit the openings 28, 29 and 30 and may engage said openings 28 and the opening 29 to retain the hitch plate 27 in a retracted position behind the bumper bar 14, as illustrated in Figures 4, 5 and 6. Said bar 14 is provided with a horizontal elongated slot 32 through which the hitch plate 27 can be projected forwardly to an operative position with the forward part thereof including the opening 29 disposed forwardly of the bar 14, and retained in this position by the latch pin 31 engaging the openings 28 and the hitch plate opening 30, as illustrated in Figures 1 to 3, in which position the hitch plate 27 may be connected to a tongue or other draft element, not shown, of a wagon or other vehicle by a conventional coupling pin, not shown, which may engage such tongue or draft element and the exposed opening 29.

From the foregoing it will be readily obvious that the tractor or other vehicle on the front end of which the bumper, pan guard and hitch 8 is mounted may be used as a draft means for pulling other vehicles with the hitch plate 27 extended as illustrated in Figures 1 to 3, and as previously described, or with the latch plate 27 retracted, as illustrated in Figures 4 to 6, the bumper 8 may be used for pushing other vehicles, a part of which may bear against the bumper bar 14 or against the upper portion of the shield or protector 17. The frames of many wagons or the like are disposed at too high an elevation to be engaged by the bar 14 and must be pushed by engagement with the upper portion of the protector or shield 17. Under such circumstances, the braces 21 will adequately brace the upper part of the protector 17 to prevent it from yielding rearwardly.

As clearly illustrated in Figure 1, the lower part of the protector 17 which depends from the bar 14 extends downwardly to below the crankcase pan so that this portion of the protector will strike any obstruction which would otherwise strike and damage the pan, to thus shield the pan from being damaged as frequently occurs in the operation of tractors.

Various modifications and changes are contemplated and may obviously be resorted to, without departing from the spirit or scope of the invention as hereinafter defined by the appended claims.

I claim as my invention:

1. A combination bumper, grill and pan guard of the character described comprising a front bumper bar, supporting arms fixed to and extending rearwardly from said front bumper bar and having outturned rear ends adapted to be secured to a front axle of a vehicle for supporting the front bumper bar in advance thereof transversely of the vehicle and in substantially a horizontal plane, a radiator and crankcase pan protector including an outer frame having side portions secured to said arms behind and adjacent the front bumper bar and an inner grill-work portion disposed within said protector frame and secured thereto, said protector being disposed in a vertical plane and including an upper portion located above said front bumper bar forming a radiator guard and a lower portion depending beneath said front bumper bar and forming a crankcase pan guard, a guide unit supported in the grill-work of said protector having a guideway extending therethrough, said front bumper bar having a slot disposed in alignment with said guideway, a hitch plate slidably disposed in said guideway, and latch means for latching said hitch plate in a retracted position behind the front bumper bar and in a projected, operative position projecting forwardly from the bumper bar through the slot thereof.

2. A structure as in claim 1, said latch means comprising top and bottom guide member units having aligned openings, said hitch plate having spaced openings to selectively align with said latch unit openings when the hitch plate is in a retracted and projected position, and a latch pin detachably engaging said aligned latch unit openings and one of said hitch plate openings for retaining the hitch plate in either a retracted or a projected position.

3. A structure as in claim 2, a forward one of said hitch plate openings being disposed forward of the bumper bar and forming a coupling pin receiving opening when said latch pin is in engagement with the other rear hitch plate opening for latching the hitch plate in a projected position.

4. In a bumper structure of the character described, a transversely disposed front bumper bar, arms fixed to and extending rearwardly from the bumper bar and adapted to be detachably secured to a front vehicle axle for supporting the bumper bar in advance thereof, a vertically disposed protector of open grill-work construction supported by said arms behind and adjacent the bumper bar including an upper portion forming a radiator guard and a lower portion forming a crankcase pan guard, said protector extending substantially above and below the bumper bar, a hitch plate, means slidably supporting said hitch plate in the bumper bar and protector, and means for detachably latching the hitch plate in either a retracted position behind the bumper bar or in a projected position with a portion of the hitch plate projecting forwardly from the bumper bar.

References Cited in the file of this patent

UNITED STATES PATENTS

| | | |
|---|---|---|
| 2,412,672 | Calhoun | Dec. 17, 1946 |
| 2,479,048 | Machin | Aug. 16, 1949 |
| 2,516,028 | Summers | July 18, 1950 |
| 2,537,553 | Schonauer | Jan. 9, 1951 |
| 2,550,310 | Stoltzfus | Apr. 24, 1951 |
| 2,620,215 | Luby | Dec. 2, 1952 |
| 2,637,586 | Meyer et al. | May 5, 1953 |
| 2,646,303 | Ferrell | July 21, 1953 |
| 2,649,308 | Bice | Aug. 18, 1953 |
| 2,678,222 | Payzant | May 11, 1954 |